US011679350B2

(12) United States Patent
Myung et al.

(10) Patent No.: US 11,679,350 B2
(45) Date of Patent: Jun. 20, 2023

(54) COVER FOR FILTER CARTRIDGE

(71) Applicant: Sung Hee Myung, Suwon-si (KR)

(72) Inventors: Sung Hee Myung, Suwon-si (KR); Sang Kun Han, Suwon-si (KR)

(73) Assignee: Sund Hee Myung, Suwon-si (KR)

( * ) Notice: Subject to any disclaimer, the term of this patent is extended or adjusted under 35 U.S.C. 154(b) by 125 days.

(21) Appl. No.: 17/206,084

(22) Filed: Mar. 18, 2021

(65) Prior Publication Data
US 2022/0219102 A1    Jul. 14, 2022

(30) Foreign Application Priority Data
Jan. 11, 2021   (KR) .................. 10-2021-0003104

(51) Int. Cl.
B01D 35/30   (2006.01)

(52) U.S. Cl.
CPC ........ B01D 35/30 (2013.01); *B01D 2201/291* (2013.01); *B01D 2201/302* (2013.01); *B01D 2201/306* (2013.01)

(58) Field of Classification Search
CPC ............. B01D 35/30; B01D 2201/291; B01D 2201/302; B01D 2201/306; B01D 29/114; B01D 35/306
USPC .......... 210/348, 248, 440–445, 455
See application file for complete search history.

(56) References Cited

U.S. PATENT DOCUMENTS

2012/0228206 A1*   9/2012   Kim ............... C02F 9/005
                                                    210/232

FOREIGN PATENT DOCUMENTS

| KR | 20-0466298 Y1 | 4/2013 |
| KR | 10-1364155 B1 | 2/2014 |
| KR | 10-2020-0083779 A | 7/2020 |

* cited by examiner

Primary Examiner — Madeline Gonzalez
(74) Attorney, Agent, or Firm — Revolution IP, PLLC

(57) ABSTRACT

A cover for a filter cartridge includes: a head including a first raw water inflow flow path into which raw water is introduced, a first purified water discharge flow path on which purified water of the raw water purified via the filter cartridge is discharged, and a first drain discharge flow path that does not communicate with each of the first raw water inflow flow path and the first purified water discharge flow path; and a cap including a second raw water inflow flow path that communicates with the first raw water inflow flow path, a second purified water discharge flow path on which purified water of the raw water introduced into the second raw water inflow flow path and purified via the filter cartridge flows, and a second drain discharge flow path on which waste water separated from the raw water during purification flows.

14 Claims, 13 Drawing Sheets

(a)

(b)

(c)

(d)

(a)            (b)

(c)

(a)

(b)

(a)

(b)

(c)

(a)

(b)

(c)

COVER FOR FILTER CARTRIDGE

CROSS-REFERENCE TO RELATED PATENT APPLICATIONS

This application claims the benefit of Korean Patent Application No. 10-2021-0003104, filed on Jan. 11, 2021, in the Korean Intellectual Property Office, the disclosure of which is incorporated herein in its entirety by reference.

BACKGROUND OF THE INVENTION

1. Field of the Invention

The present invention relates to a cover for a filter cartridge, and more particularly, to a cover for a filter cartridge, wherein only partial configuration of a cap is replaced so that the cover for the filter cartridge can be used in each of a filter cartridge from which waste water is discharged and a filter cartridge from which waste water is not discharged.

2. Description of the Related Art

In general, a water purifier uses a complex filtration filter so as to purify harmful components such as various heavy metals and impurities contained in raw water such as tap water. Representatively, a sediment filter that filters large particles such as soil or sand in raw water, a carbon filter that adsorbs and removes residual chlorine and organic chemicals, and an RO filter that filters more than 99% of various pollutants by using an extremely fine filter using a reverse osmosis method. However, in the case of the sediment filter and the carbon filter, only purified pure water is discharged due to the clean flow of raw water, whereas the RO filter discards all waste water with high impurity concentration that cannot pass through the filter and thus, requires different filter cartridge covers, which are combined according to each filter cartridge from which both purified water and waste water are discharged. Therefore, when a method according to the related art is used, due to the lacking of the compatibility of the filter cartridge covers, a filter cartridge cover is separately manufactured according to a filter cartridge to be used and thus, cost is increased, and a manufacturing process period is increased.

SUMMARY OF THE INVENTION

A cover for a filter cartridge according to the present invention has the following effects.

First, only partial configuration of a cap is replaced and thus, the cap can be used in each of a filter cartridge from which waste water is discharged and a filter cartridge from which waste water is not discharged.

Second, a head can be used in all of the filter cartridge from which waste water is discharged and the filter cartridge from which waste water is not discharged and thus, the head has high compatibility.

Third, because there is a difference in only partial configuration of the cap used in each of the filter cartridge from which waste water is discharged and the filter cartridge from which waste water is not discharged, a common portion can be manufactured together by using one facility.

The present invention provides a cover for a filter cartridge, wherein only partial configuration of a cap is replaced so that the cover for the filter cartridge can be used in each of a filter cartridge from which waste water is discharged and a filter cartridge from which waste water is not discharged.

According to an aspect of the present invention, there is provided a cover for a filter cartridge including a head including a first raw water inflow flow path into which raw water is introduced, a first purified water discharge flow path on which purified water of the raw water purified via the filter cartridge is discharged, and a first drain discharge flow path that does not communicate with each of the first raw water inflow flow path and the first purified water discharge flow path, and a cap coupled to a lower portion of the head, coupled to an upper portion of the filter cartridge, and including a second raw water inflow flow path that communicates with the first raw water inflow flow path, a second purified water discharge flow path on which purified water of the raw water introduced into the second raw water inflow flow path and purified via the filter cartridge flows, and a second drain discharge flow path on which waste water separated from the raw water during purification flows, wherein the cap is couplable to a filter cartridge from which waste water is discharged, by including a first flow path distribution device that is provided inside the cap and allows the second purified water discharge flow path and the second drain discharge flow path to be formed, or the cap is couplable to the filter cartridge from which waste water is not discharged, by replacing the first flow path distribution device with a second flow path distribution device that forms the second purified water discharge flow path and blocks the second drain discharge flow path.

According to another aspect of the present invention, there is provided a cover for a filter cartridge including a head including a first raw water inflow flow path into which raw water is introduced, a first purified water discharge flow path on which purified water of the raw water purified via the filter cartridge is discharged, and a first drain discharge flow path that does not communicate with each of the first raw water inflow flow path and the first purified water discharge flow path, and a cap coupled to a lower portion of the head, coupled to an upper portion of the filter cartridge, and including a second raw water inflow flow path that communicates with the first raw water inflow flow path, and a second purified water discharge flow path on which the raw water is introduced into the second raw water inflow flow path and is purified via the filter cartridge and the purified water flows, wherein the cap is couplable to a filter cartridge from which waste water is not discharged, by including a second flow path distribution device that is provided inside the cap, forms the second purified water discharge flow path and blocks the second drain discharge flow path, or the cap is couplable to the filter cartridge from which waste water is discharged, by replacing the second flow path distribution device with a first flow path distribution device that allows the second purified water discharge flow path and a second drain discharge flow path on which waste water separated from the raw water during purification flows, to be formed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present disclosure will be described with reference to the accompanying drawings.

Figure 1:
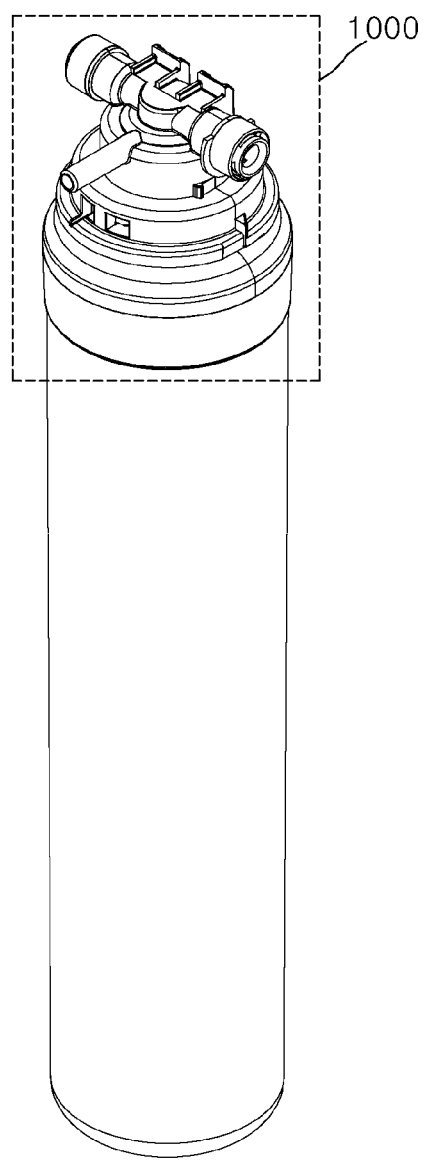
FIG. 1 is a schematic diagram showing a state in which a cover for a filter cartridge according to an embodiment of the present invention is combined with a first type filter cartridge from which waste water is discharged.
Figure 2:
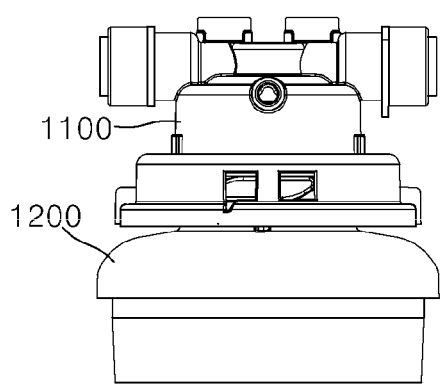
FIG. 2 is a schematic diagram showing an exploded cover for a filter cartridge of FIG. 1, wherein (a) is a front view, (b) is a plan view, (c) is a bottom perspective view and (d) is a right side view.
Figure 2:
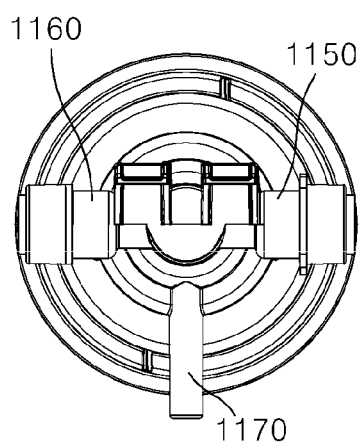
Figure 2:
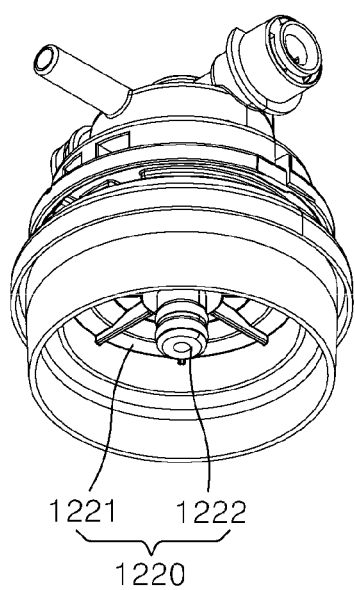
Figure 2:
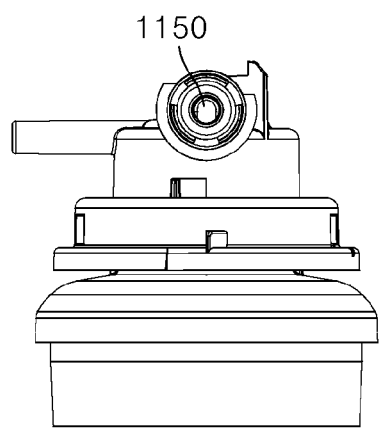
Figure 3:
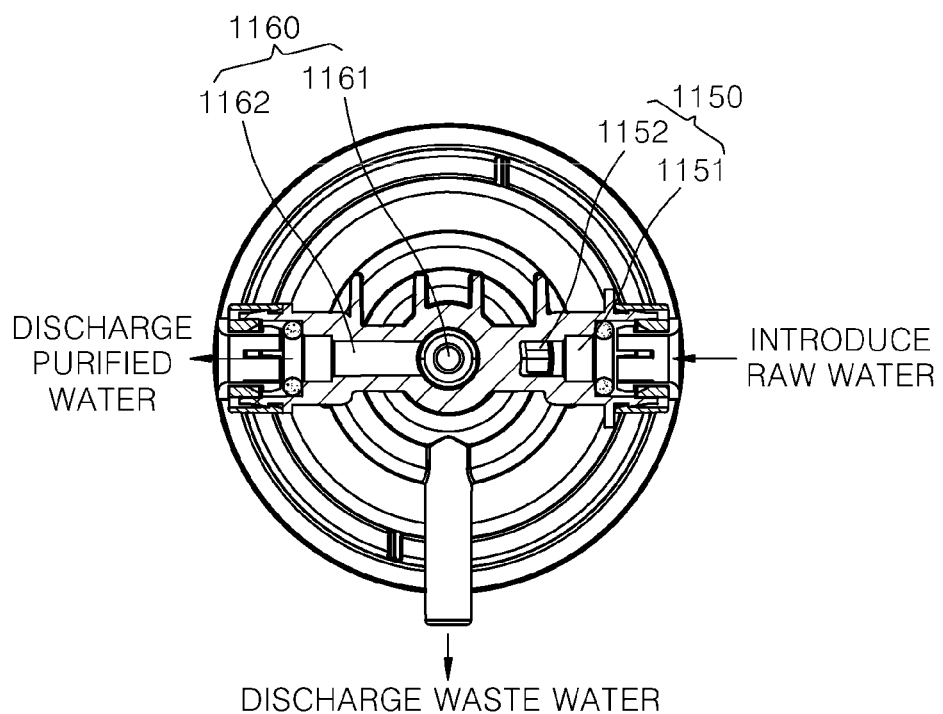
FIG. 3 is a plan cross-sectional view of the cover for the filter cartridge of FIG. 2.
Figure 4:
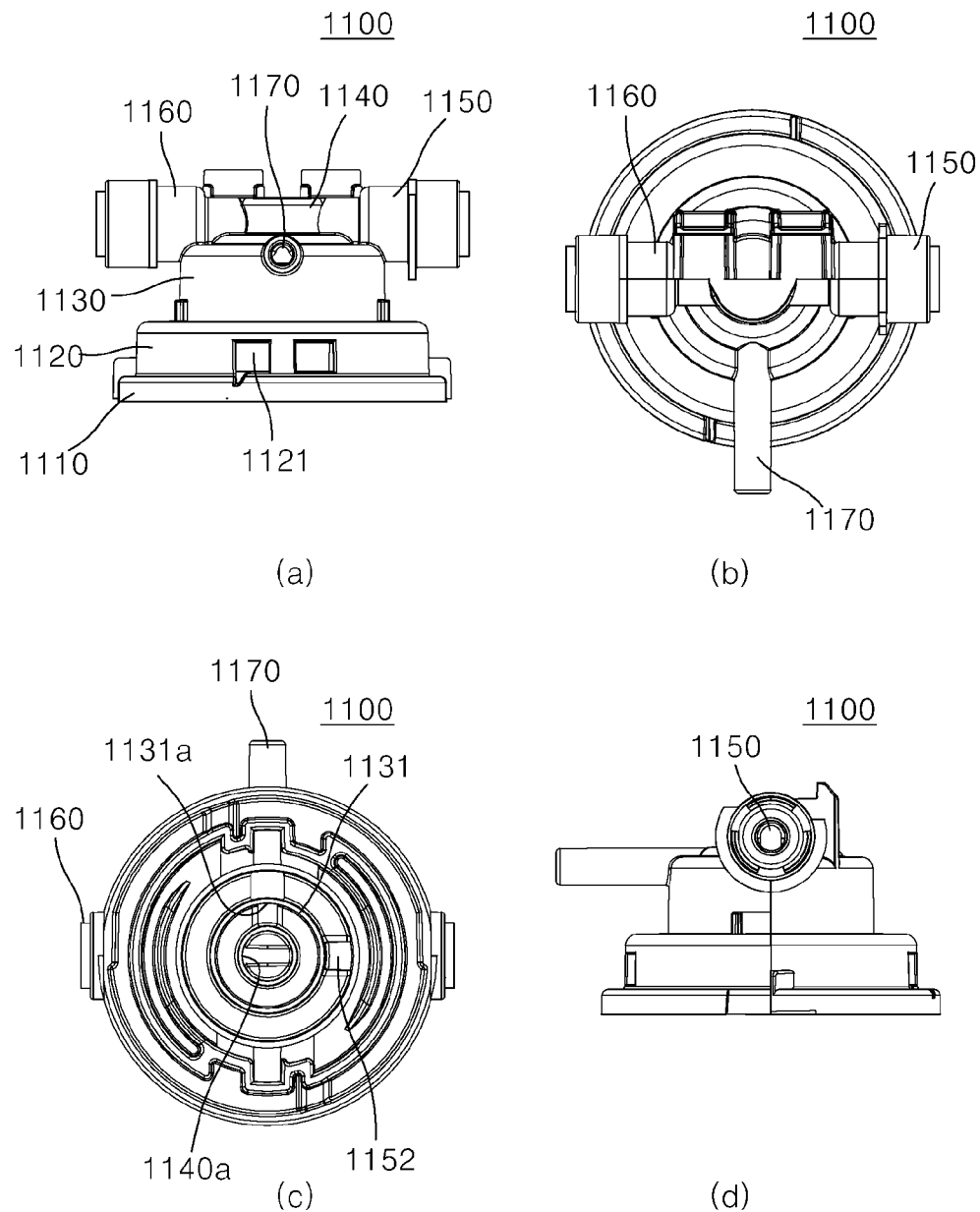
FIG. 4 is a schematic diagram showing an exploded head of the cover for the filter cartridge of FIG. 2, wherein (a) is a front view, (b) is a plan view, (c) is a bottom view and (d) is a right side view.
Figure 5:
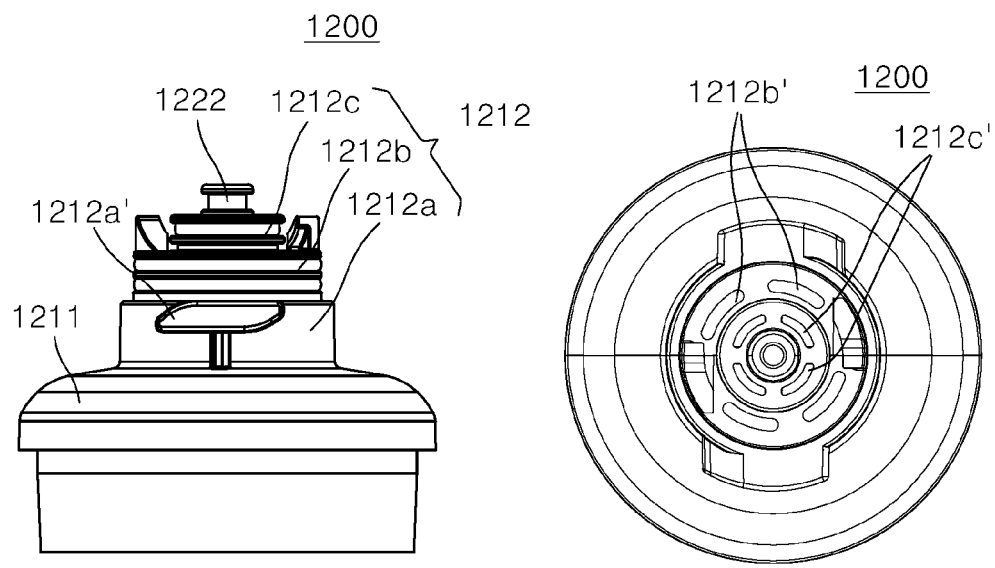
FIG. 5 is a schematic diagram showing an exploded cap for the cover for the filter cartridge of FIG. 2, wherein (a) is a front view, (b) is a plan view and (c) is a bottom perspective view.
Figure 5:
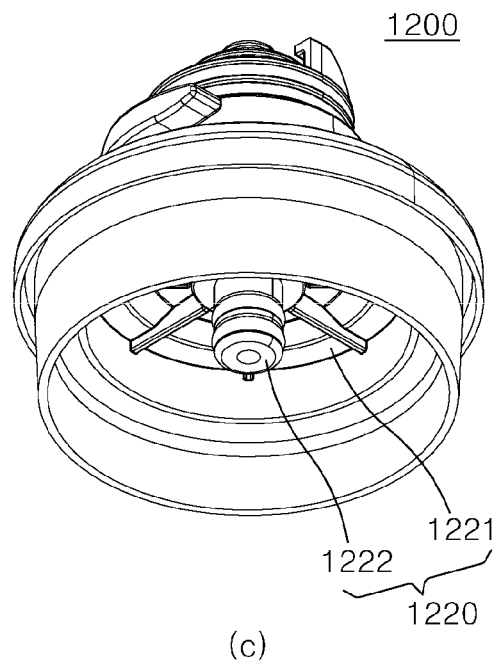
Figure 6:
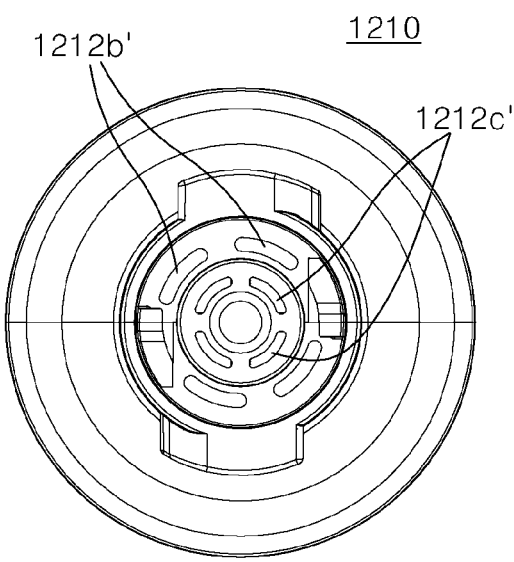
FIG. 6 is a schematic diagram showing an exploded case of the cap of FIG. 5, wherein (a) is a plan view and (b) is a bottom perspective view.
Figure 6:
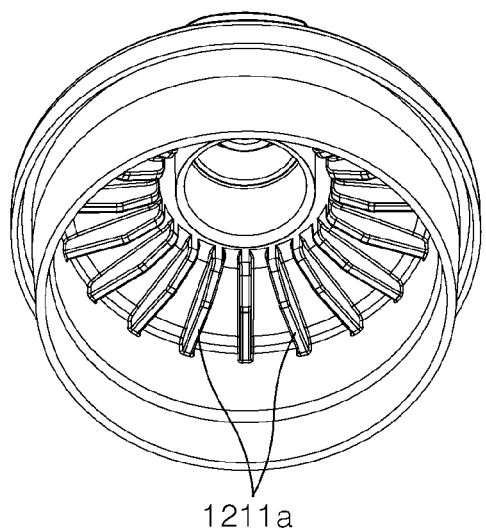
Figure 7:
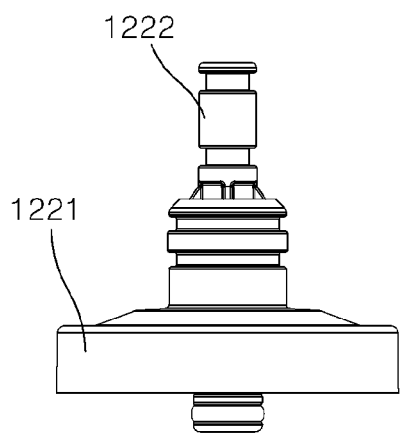
FIG. 7 is a schematic diagram showing an exploded first flow path distribution device of the cap of FIG. 5, wherein (a) is a front view, (b) is a plan perspective view and (c) is a bottom perspective view.
Figure 7:
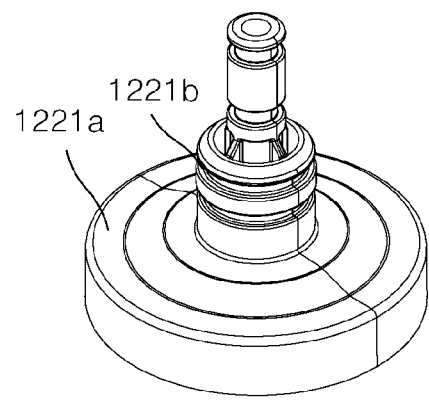
Figure 7:
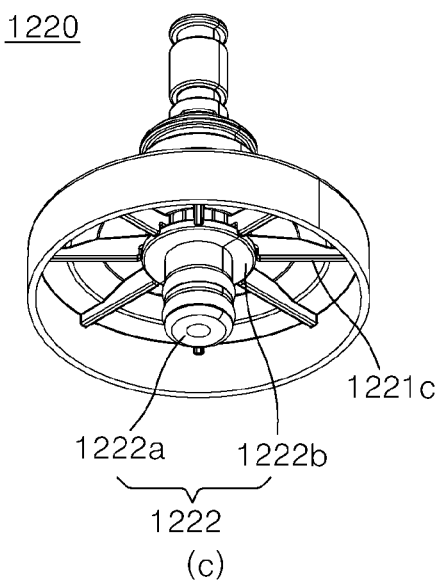
Figure 8:
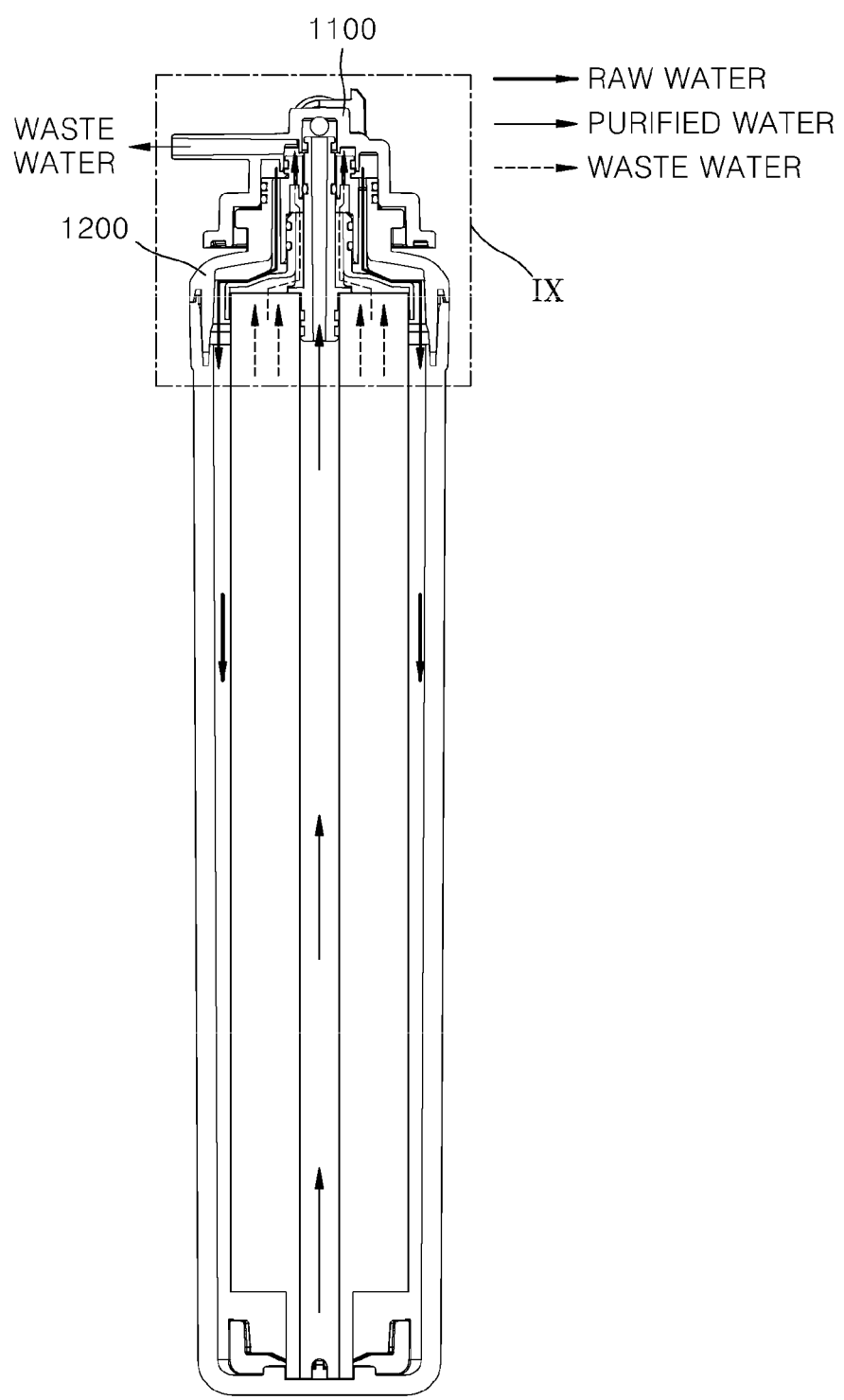
FIG. 8 is a cross-sectional view of the filter cartridge and the cover for the filter cartridge of FIG. 1.
Figure 9:
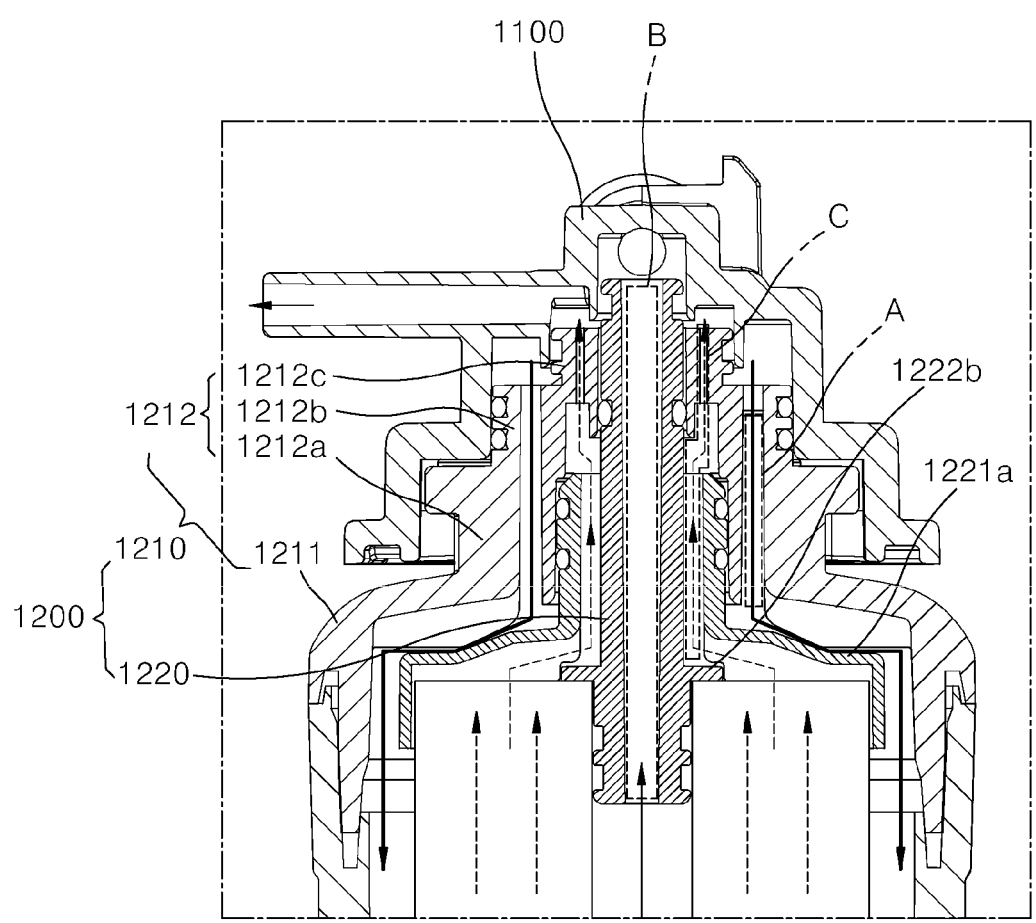
FIG. 9 is a schematic diagram of the filter cartridge of FIG. 1 from which waste water is discharged, and a flow path on which waste water flows, of the cover for the filter cartridge.

Referring to FIGS. 1 through 9, a cover 1000 of a filter cartridge according to an embodiment of the present invention includes a head 1100 and a cap 1200. FIG. 1 shows a state in which the cover 1000 of the filter cartridge is coupled to a first type filter cartridge from which wastewater is discharged. The head 1100 includes a base portion 1110, a first stepped portion 1120, a second stepped portion 1130, a third stepped portion 1140, a first raw water inflow flow path 1150, a first purified water discharge flow path 1160, and a first drain discharge flow path 1170. The cap 1200 includes a case 1210 and a first flow path distribution device 1220. The cover 1000 for the filter cartridge according to the present embodiment is combined with a first type filter cartridge in which waste water is generated. Specifically, the first type filter cartridge is an example of an RO filter. The cover 1000 of the filter cartridge according to the present embodiment is an example in which it is used in a filter cartridge used for home use.

In the present embodiment, the head 1100 is an example in which the first raw water inflow flow path 1150 and the first purified water discharge flow path 1160 are formed in a straight line in a horizontal direction. In addition, for example, the first drain discharge flow path 1170 is formed in a direction crossing the first raw water inflow flow path 1150 and the first purified water discharge flow path 1160. In addition, in the present embodiment, it is exemplified that the first drain discharge flow path 1170 does not communicate with each of the first raw water inflow flow path 1150 and the first purified water discharge flow path 1160. The head 1100 has a head groove in which the cap 1200 is inserted and coupled thereto. The head groove is formed in a structure in which the width becomes narrower from the bottom to the top. In this case, the head groove forms a step by the first stepped portion 1120, the second stepped portion 1130, and the third stepped portion 1140, and the width of the head groove becomes narrower as it goes upward. The upper portion of the head groove is sealed by the third stepped portion 1140.

The base portion 1110 has a flat structure with a portion (hereinafter, referred to as a 'horizontal portion of a base portion') extending in a set length in a center direction (hereinafter, refers to a direction toward a central axis, assuming that there is a virtual central axis extending in a vertical direction at the center of the head 1100 or the cap 1200). That is, the base portion 1110 has a structure in which a hole is formed in the vertical direction in a circular center of a plate structure. The base portion 1110 is a portion that is in close contact with the ground when the head 1100 is separated and placed on the ground.

The first stepped portion 1120 has a structure in which the first stepped portion 1120 extends in a set length upward from the extending portion of the base portion 1110 by the set length (hereinafter, referred to as a 'vertical portion of a first stepped portion') and the first stepped portion 1120 extends in a set length in the center direction from the vertical portion of the first stepped portion (hereinafter, referred to as a 'horizontal portion of a first stepped portion'). That is, the first stepped portion 1120 includes the vertical portion of the first stepped portion that is connected to a portion closest to the center of the horizontal portion of the base portion 1110 and extends upward, and the horizontal portion of the first stepped portion that is connected to the uppermost portion of the vertical portion of the first stepped portion and extends in the center direction. In the present embodiment, a cap coupling portion 1121, which is a hole drilled in a horizontal direction, is formed in the vertical portion of the first stepped portion. In the present embodiment, the cap coupling portion 1121 is exemplified that it is coupled to a head coupling protrusion 1212a' of a head coupling portion 1212 to be described below.

The second stepped portion 1130 has a structure in which the second stepped portion 1130 extends in a set length upward from the horizontal portion of the first stepped portion (hereinafter, referred to as a 'vertical portion of a second stepped portion') and the second stepped portion 1130 extends in a set length in the center direction from the vertical portion of the second stepped portion (hereinafter, referred to as a 'horizontal portion of a second stepped portion'). That is, the second stepped portion 1130 includes the vertical portion of the second stepped portion that is connected to a portion closest to the center of the horizontal portion of the first stepped portion and extends upward, and the horizontal portion of the second stepped portion that is connected to the uppermost portion of the vertical portion of the second stepped portion and extends in the center direction.

The second stepped portion 1130 has a drain flow path guide portion 1131 protruding downwardly to extend in a set length. The drain flow path guide portion 1131 protrudes downward from a portion closest to the center direction of the horizontal portion of the second stepped portion. In the present embodiment, an example is given that the drain flow path guide portion 1131 has a cylindrical shape in which the lower portion of the drain flow path guide portion 1131 is opened. In this case, a drain flow path guide portion hole 1131a is formed in the drain flow path guide portion 1131 in the horizontal direction. The drain flow path guide portion hole 1131a is in communication with the first drain discharge flow path 1170. That is, waste water, which is the concentrated liquid discharged from the filter cartridge, flows into the first drain discharge flow path 1170 through the drain flow path guide portion hole 1131a and is discharged.

The third stepped portion 1140 extends in a set length upward from the horizontal portion of the second stepped portion (hereinafter, referred to as a 'vertical portion of a third stepped portion'), extends from the vertical portion of the third stepped portion to the center direction, and seals a groove formed inside the head 1100. That is, the width of the head groove becomes narrower as it goes upward, by using the first stepped portion 1120, the second stepped portion 1130, and the third stepped portion 1140.

The first raw water inflow flow path 1150 includes a horizontal inflow flow path 1151 and a vertical inflow flow path 1152. The first raw water inflow flow path 1150 is a flow path in the form of a tube through which raw water (water in the present embodiment is exemplified) flows into the head 1100. In the present embodiment, the raw water is introduced from the right side, which is one side of the first raw water inflow flow path 1150, as an example. One side of the first raw water inflow flow path 1150 is opened. The raw water flows in from one side of the horizontal inflow flow path 1151 and then flows to the left in the center direction along the horizontal inflow flow path 1151. The raw water flows downward along the vertical inflow flow path 1152 from the left end of the horizontal inflow flow path 1151 on the other side. That is, the lower portion of the other side of the horizontal inflow flow path 1151 communicates with the upper portion of the vertical inflow flow path 1152. In this case, the horizontal direction of the other side of the horizontal inflow flow path 1151 is sealed by the outer side of the third stepped portion 1140.

The first purified water discharge flow path 1160 is formed in the center of the head groove. The first purified water discharge flow path 1160 includes a vertical discharge flow path 1161 and a horizontal discharge flow path 1162. The vertical discharge flow path 1161 extends in the vertical direction. In addition, the vertical discharge flow path 1161 communicates with a second purified water discharge flow path B formed in the cap 1200 (a hollow inside a second flow path distribution unit main body 1222a to be described below serves as a second purified water discharge flow path.) The upper portion of the vertical discharge flow path 1161 is sealed by the inner side of the third stepped portion 1140. That is, the purified water flowing along the vertical discharge flow path 1161 no longer flows upward by the inner upper surface of the third stepped portion 1140 but flows in the horizontal discharge flow path 1162.

In the present embodiment, the right side of the horizontal discharge flow path 1162 communicates with the vertical discharge flow path 1161. In this case, the horizontal discharge flow path 1162 communicates with a third stepped portion hole 1140a formed in the horizontal direction on the vertical portion of the third stepped portion 1140. At this time, the horizontal discharge flow path 1162 extends in a direction away from the center direction. In the present embodiment, the horizontal discharge flow path 1162 is formed in a direction opposite to the first raw water inflow flow path 1150, as an example.

The first drain discharge flow path 1170 is a flow path through which waste water discharged from the filter cartridge is discharged. The first drain discharge flow path 1170 extends through the vertical portion of the second stepped portion 1130 in the horizontal direction. In addition, the first drain discharge flow path 1170 communicates with the drain flow path guide portion hole 1131a formed in the horizontal direction in the drain flow path guide portion 1131. In the present embodiment, the waste water is exemplified that the raw water is discharged in a left direction opposite to that of the raw water flowing in from the right.

The cap 1200 includes a case 1210 and a first flow path distribution device 1220. The case 1210 includes a filter cartridge outer coupling portion 1211 and a head coupling portion 1212. The case 1210 has a hollow formed therein, and the upper and lower portions of the case 1210 are opened. Specifically, a first hollow is formed inside the filter cartridge outer coupling portion 1211, and a second hollow is formed inside the head coupling portion 1212. In addition, a lower portion of the case 1210 is coupled to an upper portion of the filter cartridge, and a lower portion of the case 1210 is coupled to the head groove. Specifically, the filter cartridge outer coupling portion 1211 is coupled to the upper portion of the filter cartridge, and the head coupling portion 1212 is coupled to a groove formed in the head 1100.

In the present embodiment, the filter cartridge outer coupling portion 1211 is exemplified in a cylindrical shape with an opened lower portion. In this case, a hole is formed in the center of the filter cartridge outer coupling portion 1211 in the vertical direction. In addition, filter cartridge outer coupling portion beads 1211a protruding downward at a set interval are formed inside the upper surface of the filter cartridge outer coupling portion 1211. For example, a plurality of filter cartridge outer coupling portion beads 1211a are formed so as to be spaced apart from each other.

The head coupling portion 1212 is formed to extend upward from a hole formed in the center of the filter cartridge outer coupling portion 1211. The head coupling portion 1212 has a second hollow formed therein to communicate with the first hollow. Specifically, the head coupling portion 1212 includes a first coupling portion 1212a, a second coupling portion 1212b, and a third coupling portion 1212c.

The first coupling portion 1212a communicates with the hole of the filter cartridge outer coupling portion 1211 to extend in a set length upwardly (hereinafter, referred to as a 'vertical portion of a first coupling portion') and then extends in a set length to be flat in the center direction (hereinafter, referred to as a 'horizontal portion of a first coupling portion'). In the present embodiment, a head coupling horizontal protrusion 1212a' is formed on the vertical portion of the first coupling portion and protrudes from the outer surface in the horizontal direction. In the present embodiment, it is exemplified that the head coupling horizontal protrusions 1212a' are formed in two symmetrical positions with respect to the center of the head coupling portion 1212, respectively. The head coupling horizontal protrusion 1212a' is used to secure the coupling with the head 1100.

In addition, the second coupling portion 1212b extends in a set length upward from the portion closest to the center of the horizontal portion of the first coupling portion (hereinafter, referred to as a 'vertical portion of a second coupling portion') and then extends in a set length to be flat in the center direction (hereinafter, referred to as a 'horizontal portion of a second coupling portion'). In addition, a second coupling portion hole 1212b' is formed in the horizontal portion of the second coupling portion to allow the raw water to flow from the first raw water inflow flow path 1150 to a second raw water inflow flow path A. The second coupling portion hole 1212b' is formed in a vertical direction. In addition, a plurality of the second coupling portion holes 1212b' are formed to be spaced apart from each other. In the present embodiment, it is assumed that four second coupling portion holes 1212b' are formed.

The second raw water inflow flow path A refers to a hollow formed in the case 1210 in the vertical direction. In addition, in the present embodiment, the second raw water inflow flow path A is formed along the inner edge of the case 1210 as an example. An upper portion of the second raw water inflow flow path A is in communication with the second coupling portion hole 1212b'. In addition, the lower portion of the second raw water inflow flow path A refers to a space between the inner side of the case 1210 and the outer side of the first flow path distribution device 1220.

In addition, the third coupling portion 1212c extends in a set length upward from the portion closest to the center of the horizontal portion of the second coupling portion (hereinafter, referred to as a 'vertical portion of a third coupling portion') and then extends in a set length to be flat in the center direction (hereinafter, referred to as a 'horizontal portion of a third coupling portion'). In addition, in the horizontal portion of the third coupling portion, a third coupling portion hole 1212c' is formed so that the waste water discharged from the filter cartridge can be discharged from a second drain discharge flow path C to the first drain discharge flow path 1170. The third coupling portion hole 1212c' is formed in a vertical direction. In addition, a plurality of third coupling portion holes 1212c' are formed along the edge of the horizontal portion of the third coupling portion so as to be spaced apart from each other. In addition, a hole through which the purified water discharged from the second purified water discharge flow path B to the first purified water discharge flow path 1160 passes, is formed in the center of the horizontal portion of the third coupling portion 1212c. In the present embodiment, it is assumed that four third coupling portion holes 1212c' are formed.

The second drain discharge flow path C is formed closer to the center of the case 1210 than the first raw water inflow flow path 1150. In the present embodiment, the second drain discharge flow path C is formed in the vertical direction. In addition, in the present embodiment, the second drain discharge flow path C is formed in a circular shape along a position spaced apart from the center of the case 1210 by a set interval. In addition, an upper portion of the second drain discharge flow path C is in communication with the third coupling portion hole 1212c'.

The first flow path distribution device 1220 includes a first flow path distribution unit 1221 and a second flow path distribution unit 1222. The first flow path distribution unit 1221 has a hollow formed therein, and is disposed in the hollow inside the case 1210. In addition, the first flow path distribution unit 1221 is disposed so that the upper portion of the first flow path distribution unit 1221 is coupled to the inner side of the hollow of the case 1210 and the lower portion of the first flow path distribution unit 1221 is spaced apart from the inner side of the hollow of the case 1210. In addition, the first flow path distribution unit 1221 is coupled to the upper portion of the filter cartridge. In the present embodiment, the first flow path distribution unit 1221 is exemplified in a flat cylindrical shape.

Specifically, the first flow path distribution unit 1221 includes a filter cartridge first inner coupling portion 1221a and a case coupling portion 1221b. The filter cartridge first inner coupling portion 1221a is disposed in the first hollow while being spaced apart from the inner surface of the filter cartridge outer coupling portion 1211. In addition, the filter cartridge first inner coupling portion 1221a has a third hollow formed therein. In addition, the filter cartridge first inner coupling portion 1221a has a hole formed in the center in the vertical direction, and the lower portion of the first cartridge first inner coupling portion 1221a is opened. The opened lower portion of the filter cartridge first inner coupling portion 1221a is coupled to the upper portion of the filter cartridge.

The case coupling portion 1221b protrudes while extending upward from the hole of the filter cartridge first inner coupling portion 1221a. The case coupling portion 1221b has a fourth hollow communicating with the third hollow therein. The case coupling portion 1221b is inserted into and coupled to the second hollow.

The second flow path distribution unit 1222 has a hollow inside, and is disposed in the hollow of the first flow path distribution unit 1221. The second flow path distribution unit 1222 has a lower portion coupled to an upper portion of the filter cartridge, and an upper portion coupled to an upper portion of the first flow path distribution unit 1222. Specifically, the second flow path distribution unit 1222 includes a second flow path distribution unit main body 1222a and a bead coupling unit 1222b. The second flow path distribution unit main body 1222a has a cylindrical shape and a fifth hollow is formed therein. The second flow path distribution unit main body 1222a is disposed to penetrate in the vertical direction while being spaced apart from the inner surfaces of the second hollow and the fourth hollow. The second flow path distribution unit 1222 has an upper portion coupled to the head coupling portion 1212 and a lower portion coupled to the upper portion of the filter cartridge.

In addition, the first flow path distribution unit 1221 has first flow distribution unit beads 1221c extending downwardly and protruding from an inner upper surface of the filter cartridge first inner coupling portion 1221a. A plurality of first flow path distribution beads 1221c are formed to be spaced apart from each other. In addition, the second flow path distribution unit 1222 has a bead coupling portion 1222b extending in a horizontal direction and protruding from an outer surface of a lower portion of the second flow path distribution unit 1222. The bead coupling portion 1222b is in close contact with the first flow path distribution beads 1221c so that the second flow path distribution unit 1222 does not rise above a set interval even when the second flow path distribution unit 1222 is pushed up from the bottom to the top.

In this case, the raw water introduced from the second raw water inflow flow path A moves downward through a spaced-apart space between the inner surface of the hollow of the case 1210 and the outer side of the first flow path distribution unit 1221. Waste water discharged from the filter cartridge through the spaced-apart space between the inner upper surface of the filter cartridge first inner coupling portion 1221a and the bead coupling portion 1222b by the first flow path distribution beads 1221c, flows in the direction of the spaced space between the second flow path distribution unit main body 1222a and the case coupling portion 1221b. In addition, the purified water discharged from the filter cartridge moves upward through the fifth hollow of the second flow path distribution unit 1222.

Figure 10:
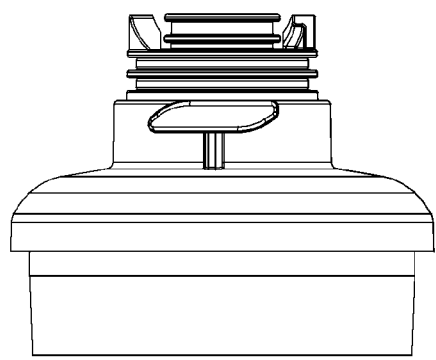
FIG. 10 is a schematic diagram showing an exploded cap of a cover for a filter cartridge according to another embodiment of the present invention, wherein (a) is a front view, (b) is a plan view and (c) is a bottom perspective view.
Figure 10:
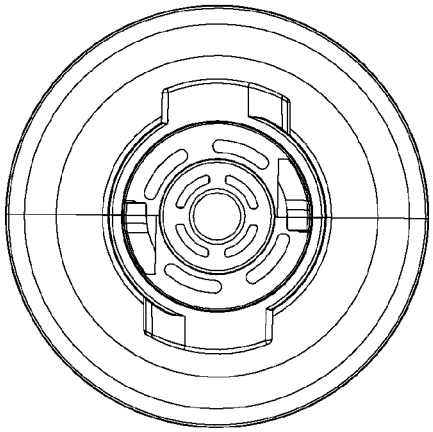
Figure 10:
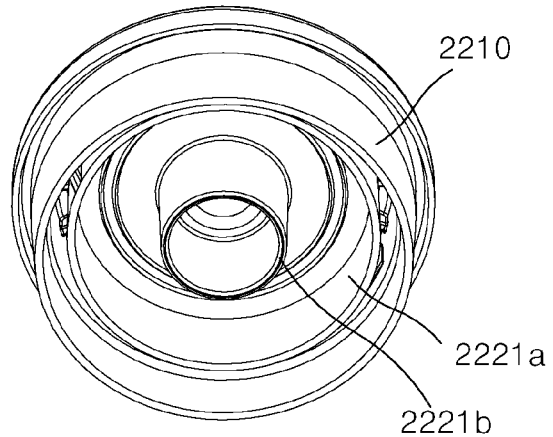
Figure 11:
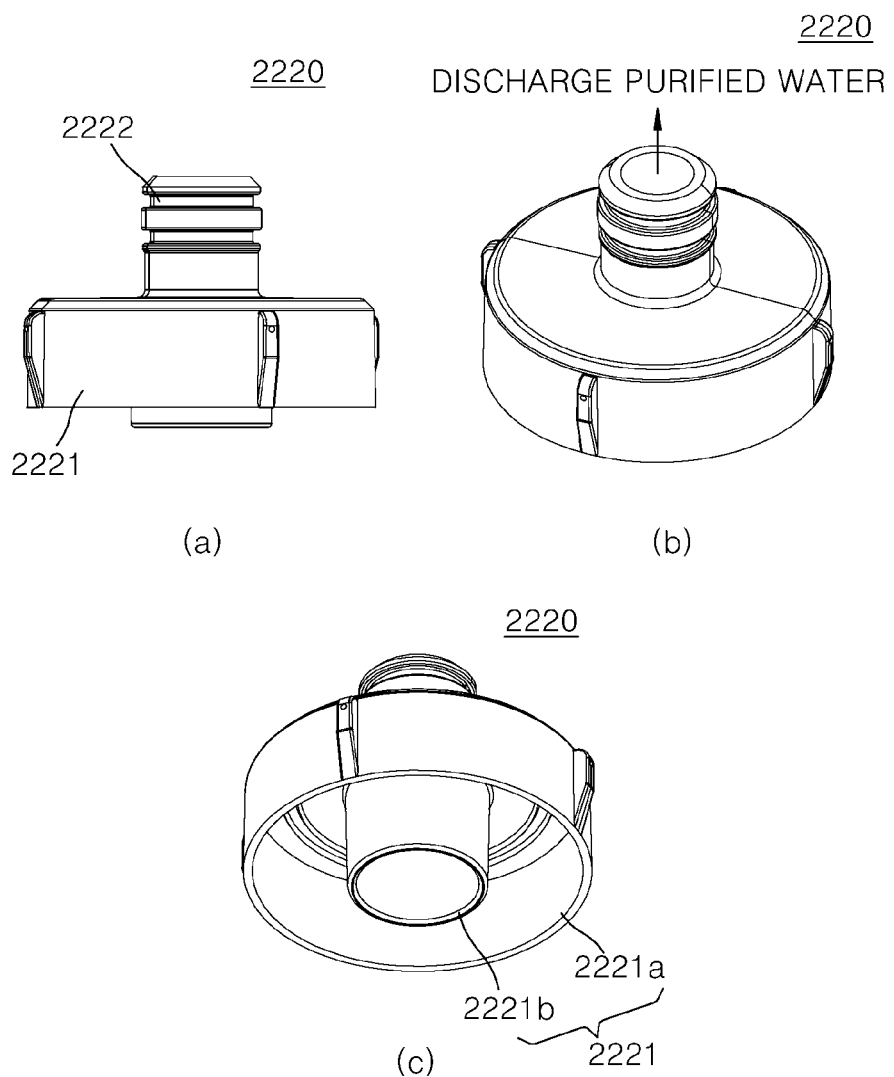
FIG. 11 is a schematic diagram showing a second flow path distribution device of the cap of FIG. 10, wherein (a) is a front view, (b) is a plan view and (c) is a bottom perspective view.
Figure 12:
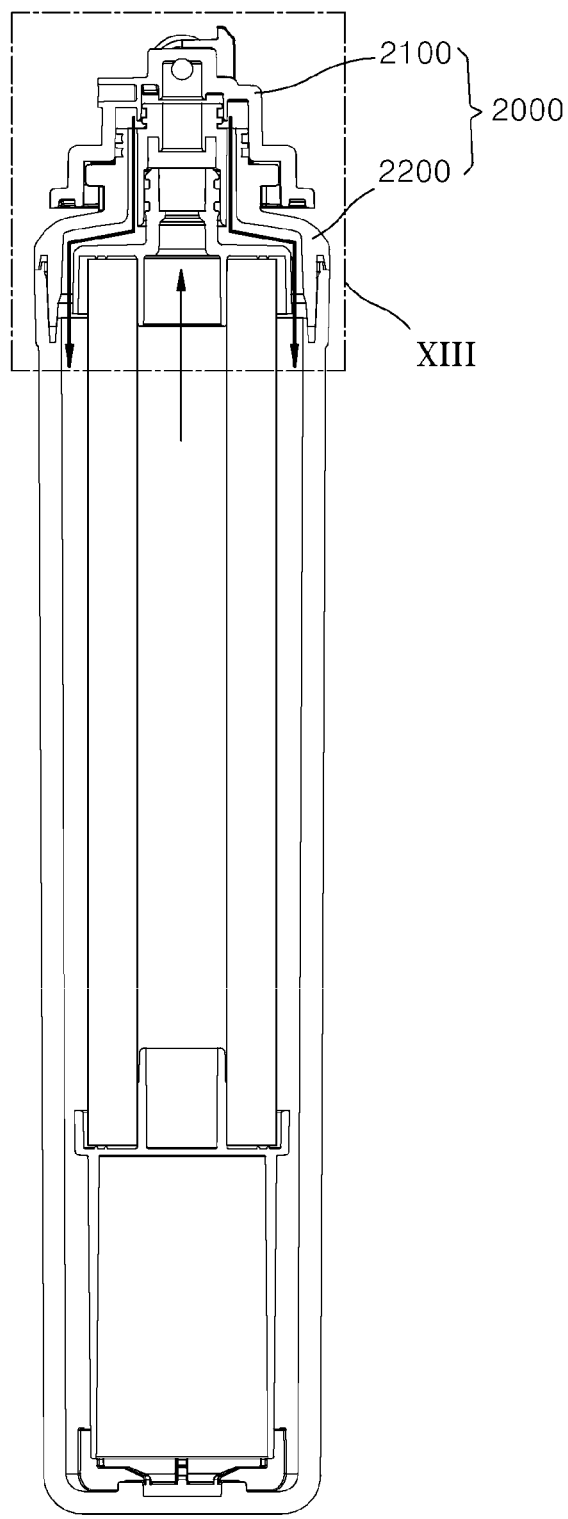
FIG. 12 is a cross-sectional view showing a state in which the cover for the filter cartridge of FIG. 10 is combined with a filter cartridge from which waste water is not discharged.
Figure 13:
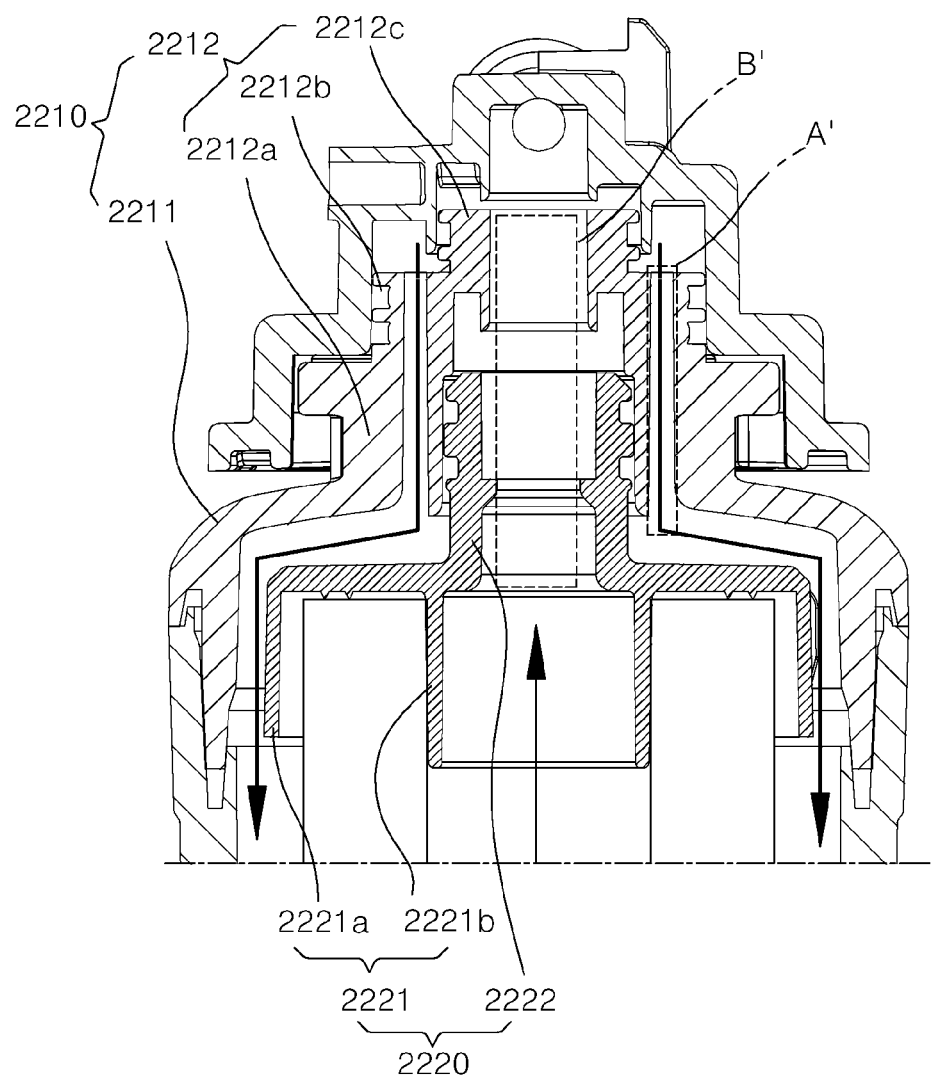
FIG. 13 is a schematic diagram showing an enlarged flow path of raw water and purified water of the cover for the filter cartridge of FIG. 12.

Referring to FIGS. 10 through 12, a cover 2000 of a filter cartridge according to another embodiment of the present invention includes a head 2100 and a cap 2200. The cap 2200 includes a case 2210 and a second flow path distribution device 2220. In addition, the case 2210 includes a filter cartridge outer coupling portion 2211 and a head coupling portion 2212. In addition, the head coupling portion 2212 includes a first coupling portion 2212a, a second coupling portion 2212b, and a third coupling portion 2212c. In addition, the second flow path distribution device 2220 includes a second flow path distribution device main body 2221 and an upper protrusion 2222. In addition, the second flow path distribution device main body 2221 includes an outer extension portion 2221a and an inner extension portion 2221b.

The cover 2000 of the filter cartridge according to the present embodiment has a difference between the cover 1000 and the cap 2200 of the filter cartridge according to FIG. 1, and the head 2100 is similar to the head 1100 according to FIG. 1. Therefore, a description of the head 2100 will be omitted. The cover 2000 of the filter cartridge of the present embodiment is coupled to a second type filter cartridge in which wastewater is not generated. Specifically, the second type filter cartridge may be any one of a sediment filter, a carbon filter, or a UF filter.

However, the cover 2000 of the filter cartridge according to the present embodiment, unlike the drain flow path guide portion hole 1131a formed in the head 1100 according to FIGS. 1 through 9, may be blocked in a state in which this drain flow path guide portion hole is not formed. In other words, the head 2100 is blocked so that any material cannot pass through the first drain discharge flow path 1170. This is because waste water is not discharged from the filter cartridge to which the cover 2000 of the filter cartridge according to the present embodiment is coupled.

The cap 2200 includes a case 2210 and a second flow path distribution device 2220. When the cap 2200 is compared with the cap 1200 according to FIG. 1, the case 2210 is similar, and there is a difference in the second flow path distribution device 2220, and thus, a description of the case 2210 will be omitted.

The second flow path distribution device 2220 has a hollow inside, and the width of the upper portion of the second flow path distribution device 2220 is narrower than that of the lower portion thereof. The second flow path distribution device 2220 is disposed in the hollow inside the case 2210. In addition, the second flow path distribution device 2220 is disposed so that the upper portion of the second flow path distribution device 2220 is coupled to the hollow inner side of the upper case 2210, and the lower portion of the second flow path distribution device 2220 is spaced apart from the hollow inner side of the lower portion of the case 2210. In addition, a lower portion of the second flow path distribution device 2220 is coupled to an upper portion of the filter cartridge.

The second flow path distribution device 2220 includes a second flow path distribution device main body 2221 and an upper protrusion 2222. The second flow path distribution device main body 2221 has a storage space formed therein, and a hole is formed in the center in the vertical direction. Specifically, the second flow path distribution device main body 2221 includes an outer extension portion 2221a formed in the vertical direction parallel to the filter cartridge outer coupling portion 1211 of FIGS. 1 through 9 and an inner extension portion 2221a formed in the vertical direction parallel to the outer extension portion 2221b.

The lower portion of the inner extension portion 2221b is coupled to the upper portion of the filter cartridge. In addition, the inner extension portion 2221b communicates with the hole of the main body. In addition, the inner extension portion 2221b extends in a set length downward from a portion separated by a set length in the horizontal direction from the center of the hole of the main body. In addition, the downwardly extending portion has a cylindrical shape in which a hollow is formed.

In this case, the raw water introduced from a second raw water inflow flow path A' flows downward through the spaced apart space between the inner surface of the hollow of the case 2210 and the second flow path distribution device main body 2221. In addition, the purified water discharged from the filter cartridge flows upward through the inner extension portion 2222b and the upper protrusion 2222 of the second flow path distribution device main body 2221. The inner extension portion 2222b and the upper protrusion 2222 serve as a second purified water discharge flow path B' in the present embodiment.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cover for a filter cartridge comprising:
a head comprising a first raw water inflow flow path into which raw water is introduced, a first purified water discharge flow path on which purified water of the raw water purified via the filter cartridge is discharged, and a first drain discharge flow path that does not communicate with each of the first raw water inflow flow path and the first purified water discharge flow path; and
a cap coupled to a lower portion of the head, coupled to an upper portion of the filter cartridge, and comprising a second raw water inflow flow path that communicates with the first raw water inflow flow path, a second purified water discharge flow path on which purified water of the raw water introduced into the second raw water inflow flow path and purified via the filter cartridge flows, and a second drain discharge flow path on which waste water separated from the raw water during purification flows, wherein
the cap is couplable to the filter cartridge from which waste water is discharged, by including a first flow path distribution device that is provided inside the cap and allows the second purified water discharge flow path and the second drain discharge flow path to be formed, or
the cap is couplable to the filter cartridge from which waste water is not discharged, by replacing the first flow path distribution device with a second flow path distribution device that forms the second purified water discharge flow path and blocks the second drain discharge flow path,
wherein the head has a head groove to which the cap is couplable, therein and the head groove is formed in a structure in which a width becomes narrower from a bottom to a top, and wherein the head comprises:
a base portion having a flat structure extending in a set length from an edge in a center direction;
a first stepped portion extending in a set length upward from a portion of the base portion extending in the set length of the base portion, and extending in a set length in the center direction from the portion extending upward in the set length;
a second stepped portion extending in a set length upward from a portion of the first stepped portion extending in a set length in the center direction, and extending in a set length in the center direction from the portion extending upward in the set length; and
a third stepped portion extending in a set length upward from a portion of the second stepped portion extending in a set length in the center direction, extending in a set length in the center direction from the portion extending upward in the set length and sealing the head groove.

2. The cover for the filter cartridge of claim 1, wherein the first raw water inflow flow path comprises:
a horizontal inflow flow path extending in a horizontal direction; and
a vertical inflow flow path that communicates with the horizontal inflow flow path and extending in a downward direction crossing the horizontal inflow flow path, and
in the horizontal inflow flow path, one side into which the raw water is introduced, is opened, and the other side opposite to the one side is sealed by an outer side of the third stepped portion.

3. The cover for the filter cartridge of claim 1, wherein the first purified water discharge flow path comprises:
a vertical discharge flow path formed in a center of the head groove,
extending in a vertical direction, a lower portion of the vertical discharge flow path communicating with the second purified water discharge flow path and an upper portion of the vertical discharge flow path being sealed by an inner side of the third stepped portion; and
a horizontal discharge flow path communicating with the vertical discharge flow path, extending while communicating with a hole formed in a horizontal direction on a portion of the third stepped portion extending upward in a set length and formed in a direction opposite to the first raw water inflow flow path.

4. The cover for the filter cartridge of claim 1, further comprising a drain flow path guide portion protruding downwardly to extend in a set length from a portion of the second stepped portion extending in a set length in the center direction and having a cylindrical shape with an opened lower portion, wherein
the first drain discharge flow path extends to penetrate a portion of the second stepped portion extending upward in the horizontal direction and communicates with a hole formed in the drain flow path guide portion in the horizontal direction.

5. The cover for the filter cartridge of claim 1, wherein, in the head, the first raw water inflow flow path and the first purified water discharge flow path are formed in a straight line.

6. The cover for the filter cartridge of claim 1, wherein the first drain discharge flow path is formed in a direction crossing the first raw water inflow flow path and the first purified water discharge flow path.

7. A cover for a filter cartridge comprising:
a head comprising a first raw water inflow flow path into which raw water is introduced, a first purified water discharge flow path on which purified water of the raw water purified via the filter cartridge is discharged, and a first drain discharge flow path that does not communicate with each of the first raw water inflow flow path and the first purified water discharge flow path; and
a cap coupled to a lower portion of the head, coupled to an upper portion of the filter cartridge, and comprising a second raw water inflow flow path that communicates with the first raw water inflow flow path, a second purified water discharge flow path on which purified water of the raw water introduced into the second raw water inflow flow path and purified via the filter cartridge flows, and a second drain discharge flow path on which waste water separated from the raw water during purification flows, wherein
the cap is couplable to the filter cartridge from which waste water is discharged, by including a first flow path distribution device that is provided inside the cap and allows the second purified water discharge flow path and the second drain discharge flow path to be formed, or
the cap is couplable to the filter cartridge from which waste water is not discharged, by replacing the first flow path distribution device with a second flow path distribution device that forms the second purified water discharge flow path and blocks the second drain discharge flow path,
wherein the cap comprises:
a case having a hollow formed therein, a lower portion of the case coupled to an upper portion of the filter cartridge, and an upper portion of the case coupled to the head groove; and
the first flow path distribution device having a hollow formed therein and disposed in the hollow inside the case, and
the first flow path distribution device comprises:
a first flow path distribution unit having a hollow formed therein, disposed in the hollow inside the case, an upper portion of the first flow path distribution unit coupled to an inner side of the hollow of the case and a lower portion of the first flow path distribution unit spaced apart from the inner side of the hollow of the case, and coupled to an upper portion of the filter cartridge; and
a second flow path distribution unit having a hollow formed therein, disposed in the hollow of the first flow path distribution unit, a lower portion of the second flow path distribution unit coupled to an upper portion of the filter cartridge, and an upper portion of the second flow path distribution unit coupled to an upper portion of the first flow path distribution unit.

8. The cover for the filter cartridge of claim 7, wherein the case comprises:
a filter cartridge outer coupling portion having a cylindrical shape with a first hollow formed therein, a lower portion of the filter cartridge outer coupling portion opened, a hole formed in a center of the filter cartridge outer coupling portion in the vertical direction, and coupled to an upper portion of the filter cartridge; and
a head coupling portion formed to extend upward from a hole formed in the center of the filter cartridge outer coupling portion, having a second hollow communicating with the first hollow and inserted into and coupled to the head groove.

9. The cover for the filter cartridge of claim 8, wherein the head coupling portion comprises:
- a first coupling portion communicating with the hole of the filter cartridge outer coupling portion to extend in a set length upwardly and then extending in a set length to be flat in the center direction;
- a second coupling portion communicating with a portion of the first coupling portion extending in a set length to be flat in the center direction, extending in a set length upward, and then extending in a set length to be flat in the center direction; and
- a third coupling portion communicating with a portion of the second coupling portion extending in a set length to be flat in the center direction, extending in a set length upward, and then extending in a set length to be flat in the center direction.

10. The cover for the filter cartridge of claim 9, wherein a plurality of holes are spaced apart from each other so that the raw water is introduced into the second raw water inflow flow path from the first raw water inflow flow path in a portion of the second coupling portion extending in a set length to be flat in the center direction.

11. The cover for the filter cartridge of claim 9, wherein a plurality of holes are spaced apart from each other so that the waste water is introduced into the first drain discharge flow path from the second drain discharge flow path in a portion of the third coupling portion extending in a set length to be flat in the center direction.

12. The cover for the filter cartridge of claim 8, wherein the first flow path distribution unit comprises:
- a filter cartridge first inner coupling portion disposed in the first hollow while being spaced apart from an inner surface of the filter cartridge outer coupling portion, having a third hollow formed therein, having a hole formed in a center in the vertical direction, a lower portion of the filter cartridge first inner coupling portion opened, and the opened lower portion of the filter cartridge first inner coupling portion coupled to the upper portion of the filter cartridge; and
- a case coupling portion having a fourth hollow communicating with the third hollow therein, protruding upwardly from the hole of the filter cartridge first inner coupling portion, and inserted into and coupled to the second hollow.

13. The cover for the filter cartridge of claim 12, wherein the second flow path distribution unit has a cylindrical shape, has a fifth hollow formed therein, disposed to penetrate in the vertical direction while being spaced apart from the inner surfaces of the second hollow and the fourth hollow, an upper portion of the second flow path distribution unit coupled to the head coupling portion and a lower portion of the second flow path distribution unit coupled to the upper portion of the filter cartridge.

14. The cover for the filter cartridge of claim 13, wherein the first flow path distribution unit comprises a plurality of beads formed on an inner top surface of the filter cartridge first inner coupling portion so as to be spaced apart from each other and protruding downwardly,
- the second flow path distribution unit comprises a bead coupling portion extending in a horizontal direction and protruding from an outer surface of a lower portion of the second flow path distribution unit, and
- the bead coupling portion is in close contact with the plurality of beads so that the second flow path distribution unit does not rise above a set interval even when the second flow path distribution unit is pushed up from the bottom to the top.

* * * * *